United States Patent Office 3,029,705
Patented Apr. 17, 1962

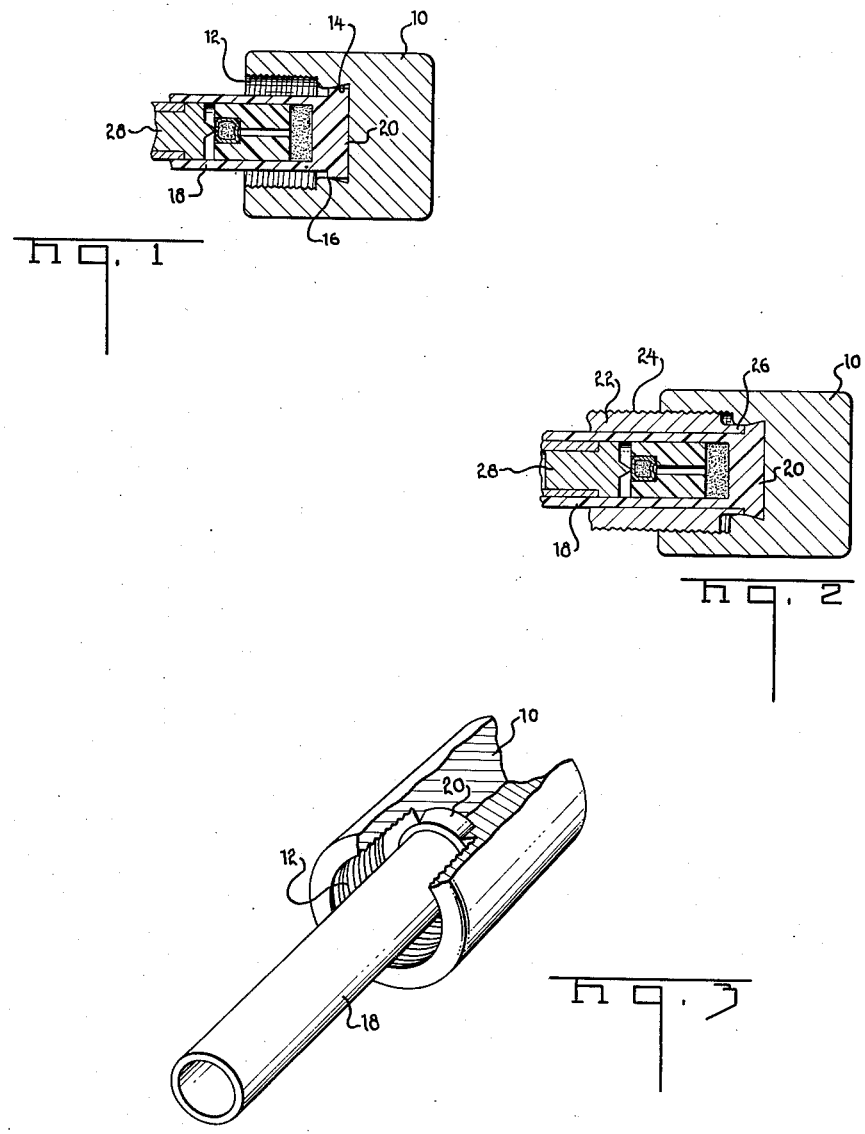

3,029,705
CLOSURE MEMBER FOR THE FIRING CHAMBER
OF AN EXPLOSIVELY-OPERATED DEVICE
William F. Broske, Camp Hill, Pa., assignor to
AMP Incorporated, Harrisburg, Pa.
Filed Aug. 18, 1959, Ser. No. 834,428
1 Claim. (Cl. 89—17)

In the use of explosively-operated devices such as crimping tools, it is desirable to have a tight seal surrounding the cartridge actuating the tool. In my previously filed copending application, Serial No. 806,093, filed April 13, 1959, I have described an explosively-operated tool for crimping electrical connectors which is actuated by a plastic cartridge containing an explosive powder. It is an object of this invention to provide a cap for the firing chamber of such an explosively-operated tool whereby the cap forms a tight seal around the cartridge and is useful in inserting or extracting the cartridge. The cap is designed to fit the chamber so that tightening the cap on the chamber causes a tight sealing of the cartridge in the chamber.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a plan sectional view of a cap for an explosively-operated device with a fragmentary view of the cartridge inserted therein;

FIGURE 2 is a view similar to FIGURE 1 illustrating the cap secured to the firing chamber of an explosively-operated device; and FIGURE 3 is a perspective view of the cap and cartridge shown in FIGURES 1 and 2 with the cap partially broken away.

As shown in FIGURE 1, the cap may comprise a cylindrical member 10 closed at one end and open at the other end 12. The inner surface of the open end 12 has internal threads which match threads on the outer surface of the firing chamber (FIGURE 2). At the bottom of the threaded aperture is a recessed portion 14. As shown in the drawings, the recessed portion 14 tapers inwardly from the bottom of the recessed aperture toward the threaded surface to form a lip 16. This tapered surface is disposed so that the bottom of the recess has a greater diameter than the lip 16 adjoining the screw-threaded aperture 12.

The cartridge member 18 (preferably plastic) has a head member 20 at its closed end and is insertable into the cap. The outside diameter of the flange on the cartridge is slightly larger than the inner diameter of the lip 16.

As shown in FIGURE 1, the cartridge may be forced into the cap by inserting the head of the cartridge into and past the lip 16 into the recess 14. Since the head of the cartridge is somewhat compressible, it may be forced past the smaller diameter of the lip and positioned within the tapered portion 14 of the recess. As shown in FIGURE 3, when the cartridge is snapped into the recess, the cap, in effect, becomes a handle for the cartridge so that the cartridge may be inserted into the tool. Additionally, when it is desired to remove the cartridge from the tool, the cap again acting as a handle will permit its extraction. It is noted that, when the flange 20 of the cartridge is inserted into the recess 14 in the cap, the cap and cartridge are relatively rotatable so that the cap may be threaded on the firing chamber without requiring rotation of the cartridge.

As shown in FIGURE 2, the cylindrical member 22 which forms the firing chamber receives the cartridge 18 therein. The outside of this cylindrical member 22 is threaded at 24 to match the internally-threaded surface 12 in the cap 10. A neck portion 26 on the free end of the firing chamber has a diameter which corresponds to the inside diameter of the lip 16. This neck portion 26 is slightly longer than the axial length of the head member 20 on the cartridge. This creates "head space" between the internal lip 16 and the neck portion 26. This also permits the cap 10 to be threaded tightly onto the firing chamber to bear upon the flange 20 on the cartridge 18. This pressure fit effects a very tight seal between the cap and the cartridge and compensates for any variations in thickness of the flange 20. In fact, as shown in FIGURE 2, the cartridge may be extruded into the inwardly tapered recess so that the area behind the firing chamber is rigidly supported.

A ram 28 (FIGURE 2) is seated within the cartridge 18 (described in my previously-identified application) so that the ram, the cylinder of the cartridge, and the internal surface of the firing chamber 22 form a very snug fit. Therefore, the cap 10 acting as a handle or gripping means provides the function of permitting the cartridge 18 to be inserted or extracted from the device quite easily. Without this gripping means, the friction fit between the cartridge and the ram on one side and the internal surface of the firing chamber on the other side would make the cartridge difficult to insert or remove. If the operator of the device wished to withdraw the cartridge without firing, such extraction would be considerably more difficult without the use of the cap operating as an extracting tool. Additionally, as noted before, the relationship between the cap and the cartridge permits the cap to extrude the head of the cartridge into the recess in the cap, thus forming an excessively tight seal.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claim when viewed in its proper perspective against the prior art.

I claim:

In combination, a firing chamber having an outside threaded surface, a neck portion at one end of said firing chamber having a diameter less than the threaded surface, an explosive cartridge of compressible material with a lip on one end seated within the firing chamber and a head member bearing against the neck portion, a cylindrical cap member closed at one end, screw threads on the open end of the cap member cooperating with the screw threads on the outside surface of the firing chamber, a recess in the bottom portion of the cap member, said recess having a diameter slightly less than the diameter of the head of the cartridge, said head of the cartridge disposed in said recess, an internal lip in said cap member formed by said diameter, and the neck portion of the firing chamber projecting into the recess in the cap, whereby said cap may be threaded onto said firing chamber with sufficient tightness to extrude the head of the cartridge into the recess in the bottom thereof and cause a tight seal, as well as provide a handle means for said cartridge.

References Cited in the file of this patent

UNITED STATES PATENTS

| | | |
|---|---|---|
| 2,001,405 | Abbot | May 14, 1935 |
| 2,072,621 | Gagle | Mar. 2, 1937 |
| 2,340,047 | Dunn | Jan. 25, 1944 |
| 2,654,319 | Roske | Oct. 6, 1953 |
| 2,880,543 | Frantzius | Apr. 7, 1959 |
| 2,912,779 | Catlin et al. | Nov. 17, 1959 |